(12) United States Patent
Ouyang et al.

(10) Patent No.: US 7,649,820 B2
(45) Date of Patent: Jan. 19, 2010

(54) APPARATUS AND METHOD FOR DETECTING DEFECT SIGNALS

(75) Inventors: Shih-Lung Ouyang, Taipei (TW); Yi-Lin Lai, Taipei (TW); Jay Hu, Taipei (TW)

(73) Assignee: Tian Holdings, LLC, Wilmington, DE (US)

( * ) Notice: Subject to any disclaimer, the term of this patent is extended or adjusted under 35 U.S.C. 154(b) by 666 days.

(21) Appl. No.: 11/050,815

(22) Filed: Jan. 27, 2005

(65) Prior Publication Data

US 2005/0180282 A1    Aug. 18, 2005

(30) Foreign Application Priority Data

Feb. 12, 2004   (TW) ............................... 93103410 A

(51) Int. Cl.
*G11B 7/00*    (2006.01)
(52) U.S. Cl. ................................. 369/53.12; 369/53.15
(58) Field of Classification Search ........................ None
See application file for complete search history.

(56) References Cited

U.S. PATENT DOCUMENTS

| | | | | |
|---|---|---|---|---|
| 6,259,664 | B1 * | 7/2001 | Kwag | 369/53.15 |
| 6,691,072 | B2 * | 2/2004 | Fuke et al. | 702/189 |
| 2002/0159349 | A1 * | 10/2002 | Katayama | 369/47.18 |
| 2005/0195717 | A1 * | 9/2005 | Lai et al. | 369/53.16 |

* cited by examiner

*Primary Examiner*—Wayne R Young
*Assistant Examiner*—Lixi Chow
(74) *Attorney, Agent, or Firm*—Perkins Coie LLP

(57) ABSTRACT

The method of detecting defect signals includes: setting a default pit length range; inputting a data signal including a plurality of pits with different pit lengths; transferring the data signal into NRZ signal and counting the pit length of each pit; accumulating the number of the pits whose pit length are within the default pit length range, and accumulating the number of the pits whose pit lengths are outside the default pit length range but within the corresponding ranges; changing the logic state of a defect flag signal when one of the accumulative value reaches a corresponding threshold. The present invention also provides an apparatus for detecting defect signals.

25 Claims, 10 Drawing Sheets

| Pit name | Bit Pattern |
| --- | --- |
| 3T | 100"1" |
| 4T | 1000"1" |
| 5T | 10000"1" |
| 6T | 100000"1" |
| 7T | 1000000"1" |
| 8T | 10000000"1" |
| 9T | 100000000"1" |
| 10T | 1000000000"1" |
| 11T | 10000000000"1" |
| ie : "1" the MSB of next bit pattern | |

APPARATUS AND METHOD FOR DETECTING DEFECT SIGNALS

RELATED APPLICATIONS

The present application is based on, and claims priority from, Taiwan, R.O.C. Application Serial Number93103410, filed Feb. 12, 2004, the disclosure of which is hereby incorporated by reference herein in its entirety.

BACKGROUND OF THE INVENTION

1. Field of the Invention

The invention relates to a method and apparatus for detecting data signals in an optical disk system, and more particularly to a method and apparatus for detecting defect signals in an optical disk system.

2. Discription of the Prior Art

Because of the invention of the optical storage media, it is not difficult to store massive data. And because the optical storage media store data by recording data in the optical storage media in a digital way, data can be stored in a longer time compared with the conventional magnetic media in an analog way. In the meantime, the data will not be distorted with the time passing.

The earliest specification (red book) of the optical storage media was accomplished by Philip and Sony at 1980. Thereafter, many other specifications (e.g. yellow book, orange book . . . ) were finished for accommodating different contents. But basically, the storing formats of the optical storage media are the same, and they are expanded in accordance with the red book.

The data signal has to be modulated before stored in the optical storage media. For compact disk (CD), the data signal is processed in Eight to Fourteen Modulation (EFM) first. The modulated signal is a series of binary signals with the combination of logic "1" and logic "0". If the binary signals are written into the CD directly, the pickup head of the optical storage media can not read the logic level states of every bit precisely, because the lengths of the binary pits are just about 0.13 um-0.15 um. Therefore, the modulated data signals have to be coded in the different lengths of pits (or lands) with lengths of 3T to 11T (3T, 4T, 5T, 6T, 7T, 8T, 9T, 10T, and 11T)(as shown in FIG. 1A), and stored in the optical storage media. The coding method of 3T to 11T is so called (2,10) RLL (Run Length Limited) coding (as shown in FIG. 1B). That means the data tracks of the optical disks are made of the helical tracks of pits with 9 different lengths. As shown in FIG. 2, 2A is a piece of data signal of the data track in an optical disk. RF signal 2B is reflected from the pickup head by tracking the data signals of the data track, while 2C is the NRZ signal corresponding to 2A in the (2,10) RLL coding. Because the reflected RF signal caused by the pits with different lengths has different signal amplitude intensities, the system can identify every data signal in accordance with its amplitude intensity. When the logic level of the NRZ signal in 2C changes (from the logic high level to logic low level, or from the logic low level to logic high level), it indicates logic "1". When the logic level keeps the same, it indicates logic "0".

Similarly, DVD (digital versatile disk) adopts the same method. The data signal is processed in 8 to 16 modulation (EFM plus), which are coded in 3T to 11T respectively and plus a 14T component, then the pits with different lengths are formed and stored in a DVD. For an optical disk, there is a plastic layer on its surface for protection, but it is likely to have defect signals produced by scratches or some exterior factors, such as the process of recording, fingerprints . . . etc. The defect signals cause the pickup head not to reflect the correct RF signals when tracking. Therefore, the optical disk system cannot read out the needed data signals and then cause false movements.

The RF signals produce irregular variation because of the existing defect signals. The conventional way of detecting defect signals is as shown in FIG. 3 which adds the reference voltage level 3B to the RF signals 3A reflected from data signals. When the voltage level of the envelope signal 3C of the RF signal 3A is lower than the reference voltage level 3B (as shown in the 3E area of FIG. 3), the defect flag signal 3D arises from the logic low level to logic high level to denote the 3E area has a defect signal, and inform the servo system of the optical disk system not to lock frequency to prevent from making a mistake.

But when the defect signals of the optical disk are not serious (e.g. defects caused by scratches and fingerprints), if the method described above is still adopted, it is possible the location of the defect signal cannot be found by the reflected RF signal from the data signal, as shown in FIG. 4. The voltage level of the defect portion in the envelope signal 4C of the RF signal 4A (as shown in 4E area of FIG. 4) is higher than the reference voltage level 4B in contrast. Thereby, the location of the defect signal cannot be found by the reflected RF signal from the data signal, and the defect flag signal 4D cannot reflect the appearance of the defect signal correctly.

SUMMARY OF THE INVENTION

The present invention provides an apparatus and method for detecting defect signals to make the optical disk system be able to correctly identify the portion of the optical disk with defect signals to prevent the optical disk system from generating false movements because of the data signal reading with defects.

The apparatus for detecting defect signals of the present invention includes: a buffering memory for storing data signals of the optical disk wherein every data signal includes a plurality of pits with different lengths; a first counter for counting the length of each pit; a second counter for accumulating the number of the pits whose pit lengths are within a default pit length range and comparing the accumulated number with the corresponding default threshold; a third counting unit including a plurality of the third counters; and a defect signal detecting circuit for generating a defect flag signal and change its logic level in accordance with the result of the comparison by comparing the accumulated numbers of the second counter and a plurality of the third counters with the corresponding thresholds. Therein, each of the third counters includes a corresponding range of the pit length, and accumulates the number of the pits whose pit lengths are both outside the default pit length range and within each of the corresponding range of the pit length respectively. In the meantime, each of the third counters has a corresponding default threshold to be compared with the corresponding accumulated numbers respectively.

The method for detecting defect signals of the present invention includes: setting a default pit length range; inputting a batch of data signals including a plurality of pits with different lengths; converting the data signals into the NRZ signals and counting the pit length of each pit in the data signals respectively; and accumulating the numbers of the pits whose pit lengths are within or outside the default pit length range and triggering a defect flag signal as a logic high level or logic low level when one of the accumulated numbers reaches the corresponding default threshold.

DESCRIPTION OF THE PREFERRED EMBODIMENT

The present invention provides an apparatus and method for detecting defect signals which can make the optical disk system to detect the defect signals of the optical disk correctly. The following illustrates the preferred embodiment of the present invention. But the skilled in the art should understand that is only an illustration and not to limit the present invention itself. The preferred embodiment of the present invention is described as follows.

Figures 1A, 1B:
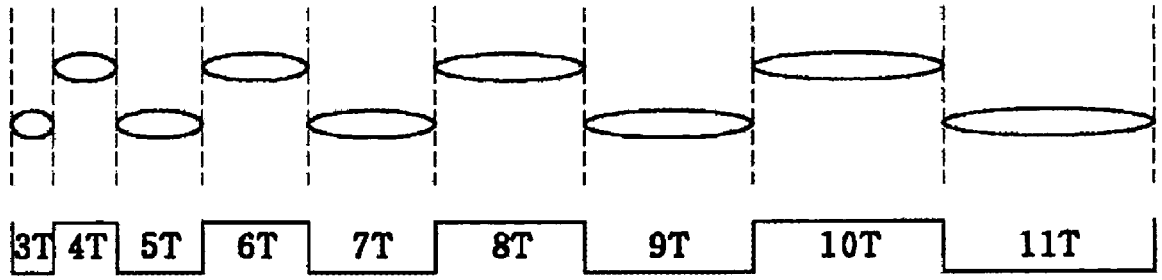
FIG. 1A is the diagram of pit length.
FIG. 1B is the diagram of pit length.
Figure 2:
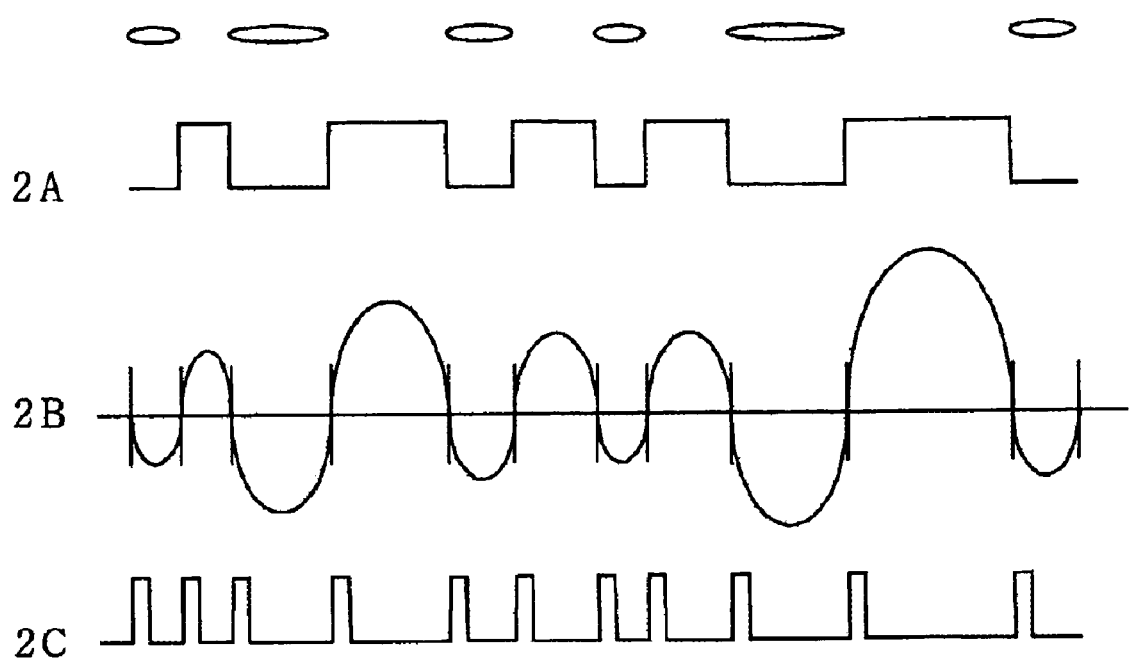
FIG. 2 is the diagram of the data signals of an optical disk.
Figure 3:
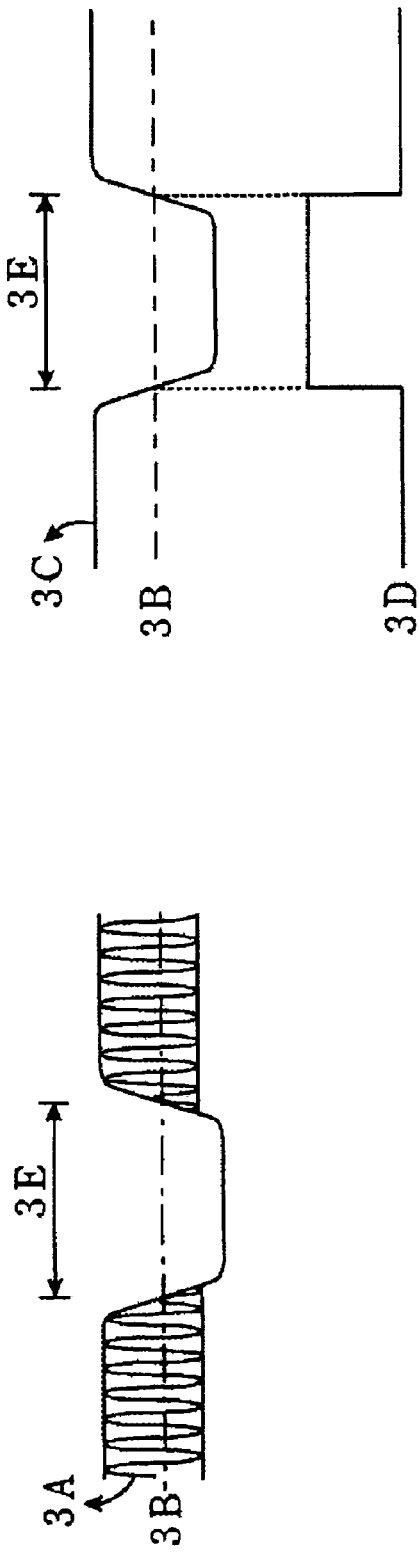
FIG. 3 is the diagram of a prior art for detecting defect signals.
Figure 4:
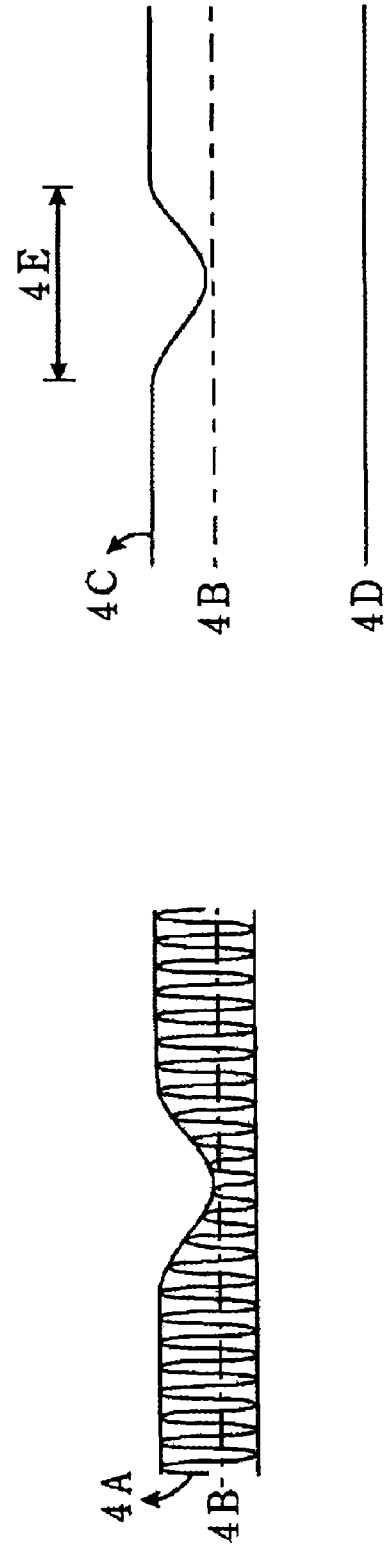
FIG. 4 is the diagram of another prior art for detecting defect signals.
Figure 5:
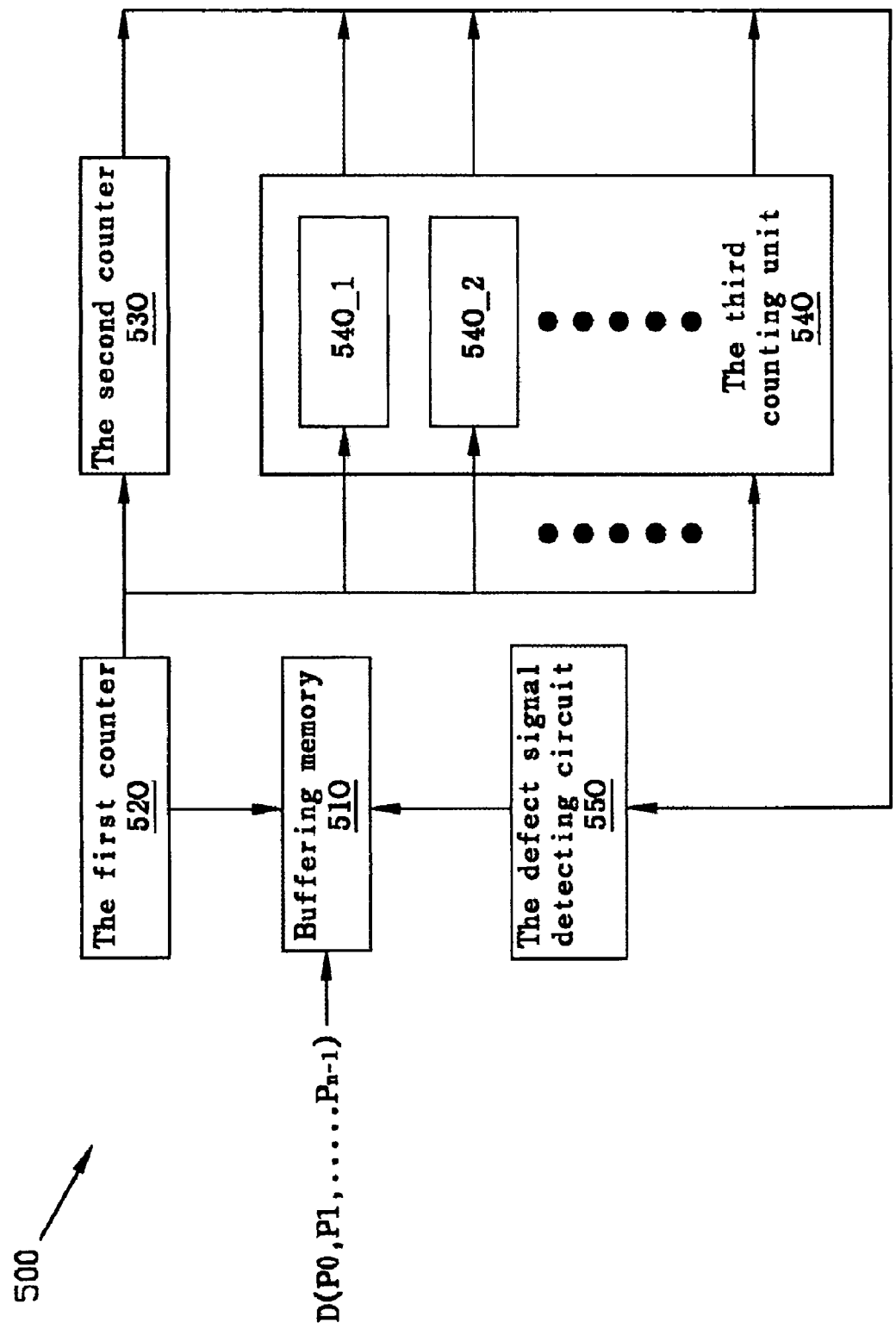
FIG. 5 is the apparatus for detecting defect signals of the present invention.

As shown in FIG. 5, the apparatus for detecting defect signals of the present invention 500 includes: a buffering memory 510, a first counter 520, a second counter 530, a third counting unit 540, and a defect signal detecting circuit 550. The buffering memory 510 stores the data signals of the optical disk, wherein every data signal includes a plurality of pits with different lengths. The first counter 520 couples to the buffering memory 510 for counting the length of each pit. The second counter 530 couples to the first counter for accumulating the number, counted by the first counter, of the pits whose pit lengths are within a default pit length range each time, and compare the accumulated number CNT2 with the corresponding default threshold SHR2. The third counting unit includes a plurality of the third counters (540_1, 540_2 ...) and couples to the first counter 520. Each of the third counters (540_1, 540_2 ...) includes a corresponding pit length range outside the default pit length range respectively to accumulate the numbers within the corresponding pit length (CNT3_1, CNT3_2 ...) respectively. In the meantime, each of the third counters (540_1, 540_2 ...) includes a corresponding default threshold (SHR3_1, SHR3_2 ...) respectively to be compared with the corresponding accumulated number (CNT3_1, CNT3_2 ...) respectively. The defect signal detecting circuit 550 generates a defect flag signal DEF_FLAG set at the first logic level. The defect flag signal DEF_FLAG changes its logic level in accordance with the result of the comparison by comparing the accumulated numbers CNT2, (CNT3_1, CNT3_2 ...) of the second counter 530 and the third counting unit 540 with the corresponding default thresholds SHR2, (SHR3_1, SHR3_2 ...). In another word, the logic level of the defect flag signal DEF_FLAG becomes the second logic level (assumed as the high logic level, the logic 1), if the logic level of the defect flag signal DEF_FLAG is the default first logic level (assumed as the low logic level, the logic 0) and a defect signal is identified.

The method for detecting defect signals of the present invention includes the follows. A default pit length range is set. Then, a batch of the data signals $D(P_0, P_1, P_2 \ldots P_{N-1})$ are input to the buffering memory 510, and the batch of the signals $D(P_0, P_1, P_2 \ldots P_{N-1})$ includes N pits. A defect flag signal DEF_FLAG is set to indicate if the batch of the signals $D(P_0, P_1, P_2 \ldots P_{N-1})$ include any defect signal or not, while the default of the defect flag signal DEF_FLAG is maintained at the first logic level (when there is no defect signal). The data signals with N different pits are converted into the NRZ signals, and then each pit length $(L_0, L_1, L_2 \ldots L_{N-1})$ is counted by the first counter in the order of the pits, and then output to the counter with the corresponding range in accordance with the counted result. The second counter 530 is employed to accumulate the numbers CNT2 of the pits whose pit lengths are within the default pit length range, or each of the third counters (540_1, 540_2 ...) of the third counting unit 540 is employed to accumulate the number of the pits whose pit lengths are outside the default pit length range and the number (CNT3_1, CNT3_2 ...) of the corresponding range of the pit length for each of the third counters (540_1, 540_2 ...). The accumulated numbers CNT2 and (CNT3_1, CNT3_2 ...) and the default thresholds SHR2 and (SHR3_1, SHR3_2 ...) are compared each time. When the accumulated numbers reach the default thresholds, the logic level of the defect flag signal DEF_FLAG is changed (If being the first logic level, the logic level of the defect flag signal DEF_FLAG is changed to the second logic level; in contrast, if being the second logic level, the logic level of the defect flag signal DEF_FLAG is changed to the first logic level). When counting each of the pit lengths of the data signals is finished, all of the accumulated numbers of the counters are reset.

When detecting the logic level of the defect flag signal DEF_FLAG is changed, the optical disk servo system controls whether to lock frequency in accordance with the state of the logic level (If the defect flag signal DEF_FLAG is at the default first logic level, the optical disk servo system locks frequency; in contrast, if the defect flag signal DEF_FLAG is at the second logic level, the optical disk servo system does not lock frequency).

It is noted the accumulated number CNT2 is the number of the accumulated pits whose pit lengths are within the default pit length range. The result of the comparison of the accumulated numbers CNT2 and the default threshold SHR2 can work as the standard about whether the defect flag signal DEF_FLAG returns to the default first logic level from the second logic level to indicate there is no defect signal in the portion of the of the data signals $D(P_0, P_1, P_2 \ldots P_{N-1})$. If the defect flag signal DEF_FLAG has been at the default first logic level, the logic level of defect flag signal DEF_FLAG remains at the default first logic level even the accumulated number CNT2 reaches the default threshold SH2.

It is also noted the accumulated numbers (CNT3_1, CNT3_2 ...) are the numbers when that the pit lengths of the accumulated pits are outside the default pit length range (such as bigger than the default pit length range, or smaller than the default pit length range) happens. The result of the comparison of the accumulated numbers (CNT3_1, CNT3_2 ...) and the default thresholds (SHR3_1, SHR3_2 ...) can work as the standard about whether the defect flag signal DEF_FLAG returns to the second logic level from the default first logic level to indicate there are defect signals in the portion of the data signals $D(P_0, P_1, P_2 \ldots P_{N-1})$. If the defect flag signal DEF_FLAG has been at second logic level, the logic level of defect flag signal DEF_FLAG remains at the second logic level even one of the accumulated numbers (CNT3_1, CNT3_2 . . . ) reaches the its corresponding default threshold (SHR3_1, SHR3_2 . . . ).

Figure 6A:
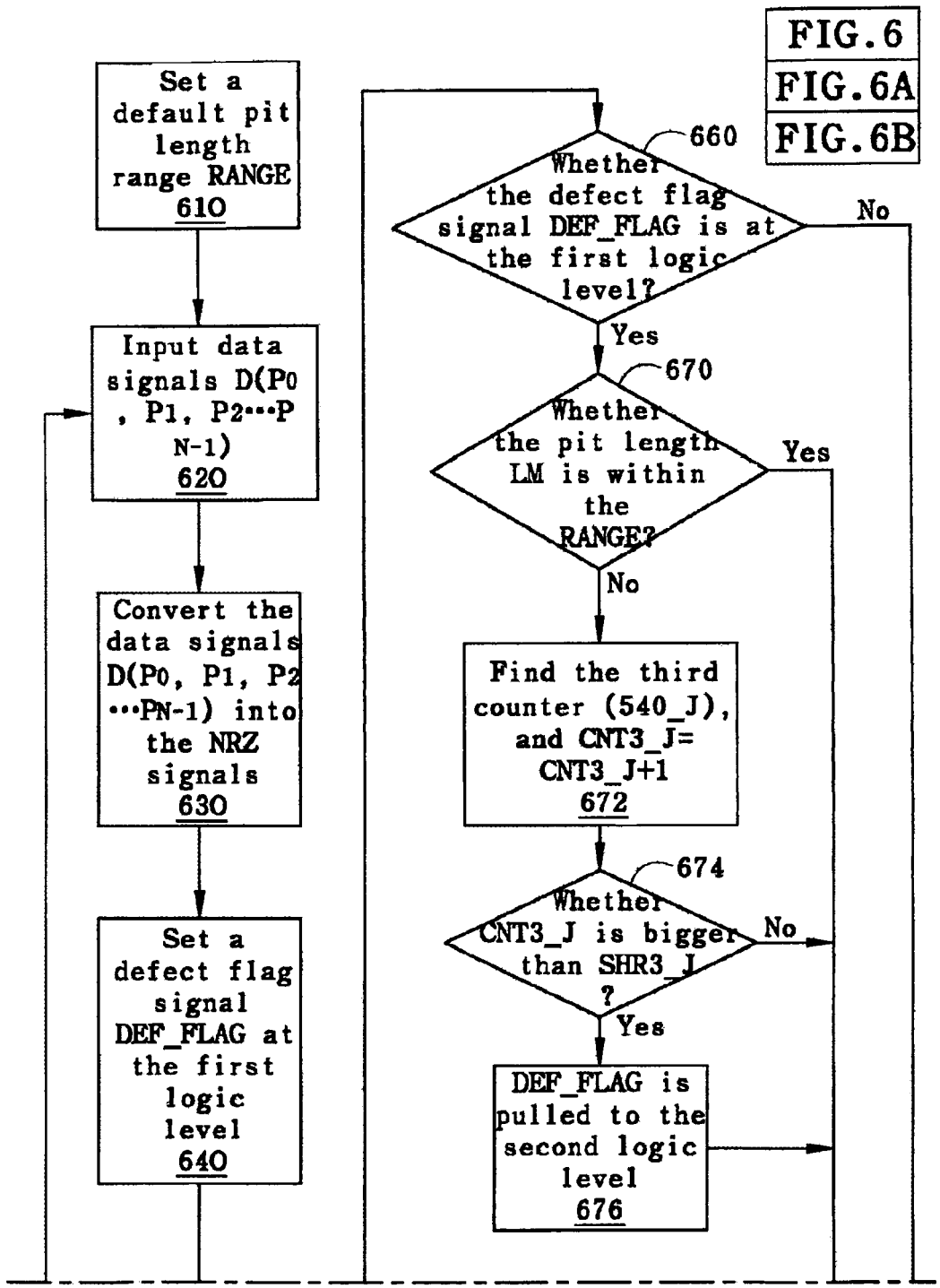
FIG. 6 is the flow chart for detecting defect signals of the present invention.
Figure 6B:
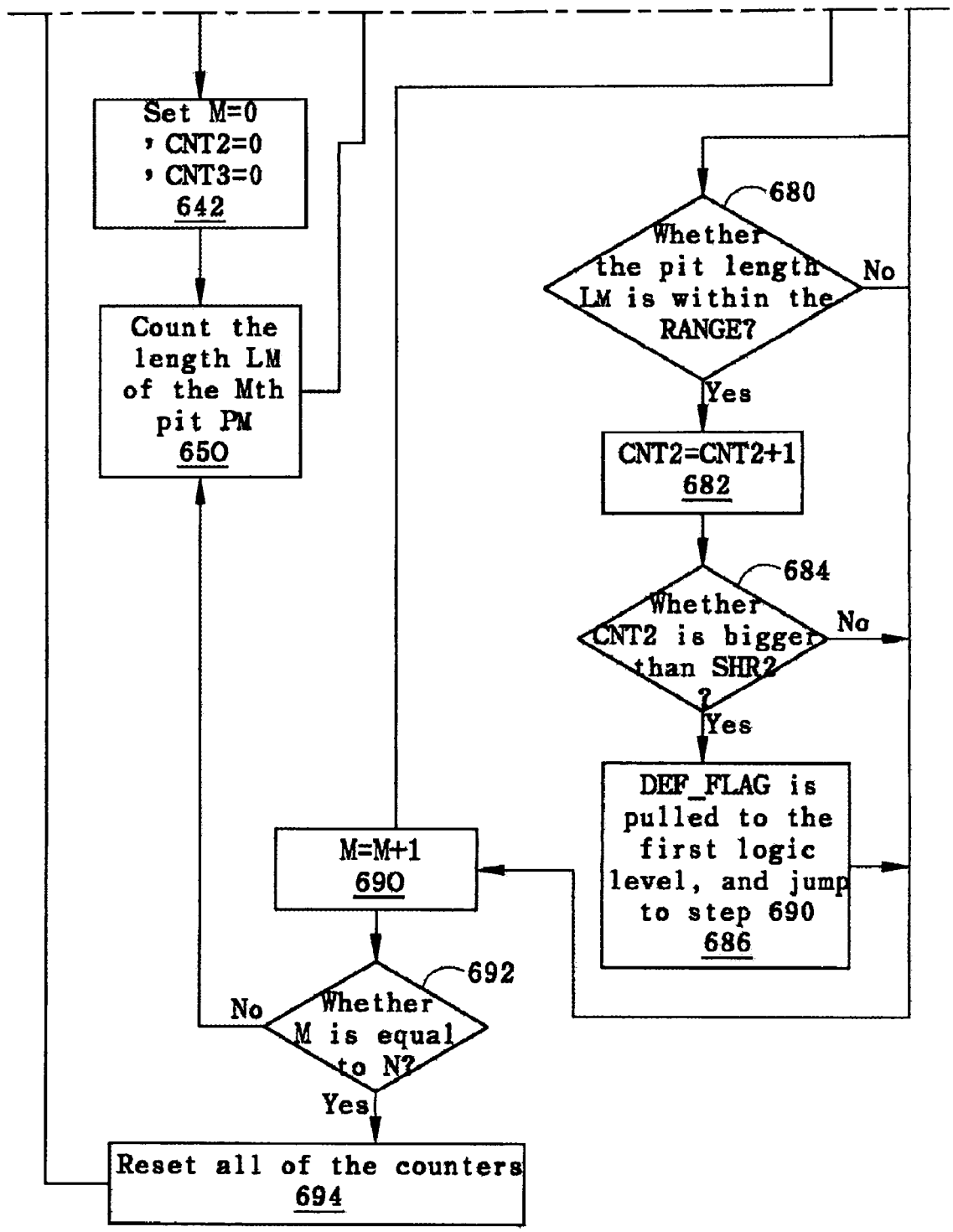

The method is shown as FIG. 6:

Set a default pit length range (610);

Input data signals $D(P_0, P_1, P_2 \ldots P_{N-1})$ including a plurality of pits (620);

Convert the data signals $D(P_0, P_1, P_2 \ldots P_{N-1})$ into the NRZ signals (630);

Set a defect flag signal DEF_FLAG at the first logic level (640);

Set M=0, CNT2=0, CNT3=0 (CNT3_1, CNT3_2 . . . ) (642);

Count the length $L_M$ of the Mth pit $P_M$ (650);

Judge whether the defect flag signal DEF_FLAG is at the first logic level; if yes, execute step 670, otherwise, execute step 680 (660);

Judge whether the pit length $L_M$ is within the default pit length range; if yes, execute step 690, otherwise, execute step 672 (670);

Find the counter (540_J) of the corresponding range of the pit length $L_M$ among the third counters (540_1, 540_2 . . . ), and add 1 to the accumulated number CNT3_J of the third counter 540_J (CNT3_J=CNT3_J+1) (672);

Judge whether CNT3_J reaches the default threshold SHR3_J; if yes, execute step 676, otherwise, execute step 690 (674);

The defect flag signal DEF_FLAG is pulled to the second logic level, and jump to step 690 (676);

Judge whether the pit length $L_M$ is within the default pit length range; if yes, execute step 682, otherwise execute step 690 (680);

The accumulated number CNT2 of the second counter 530 is CNT2=CNT2+1 (682);

Judge whether the accumulate number CNT2 reaches the default threshold SHR2; if yes, execute step 686, otherwise, execute step 690 (684);

The defect flag signal DEF_FLAG is pulled to the first logic level, and jump to step 690 (686);

M=M+1, and return to step 650 (690);

Judge whether M is equal to N; if yes, execute step 694, otherwise, execute step 692 (692); and Reset all of the counters, and return to step 620 (694).

Figure 7:
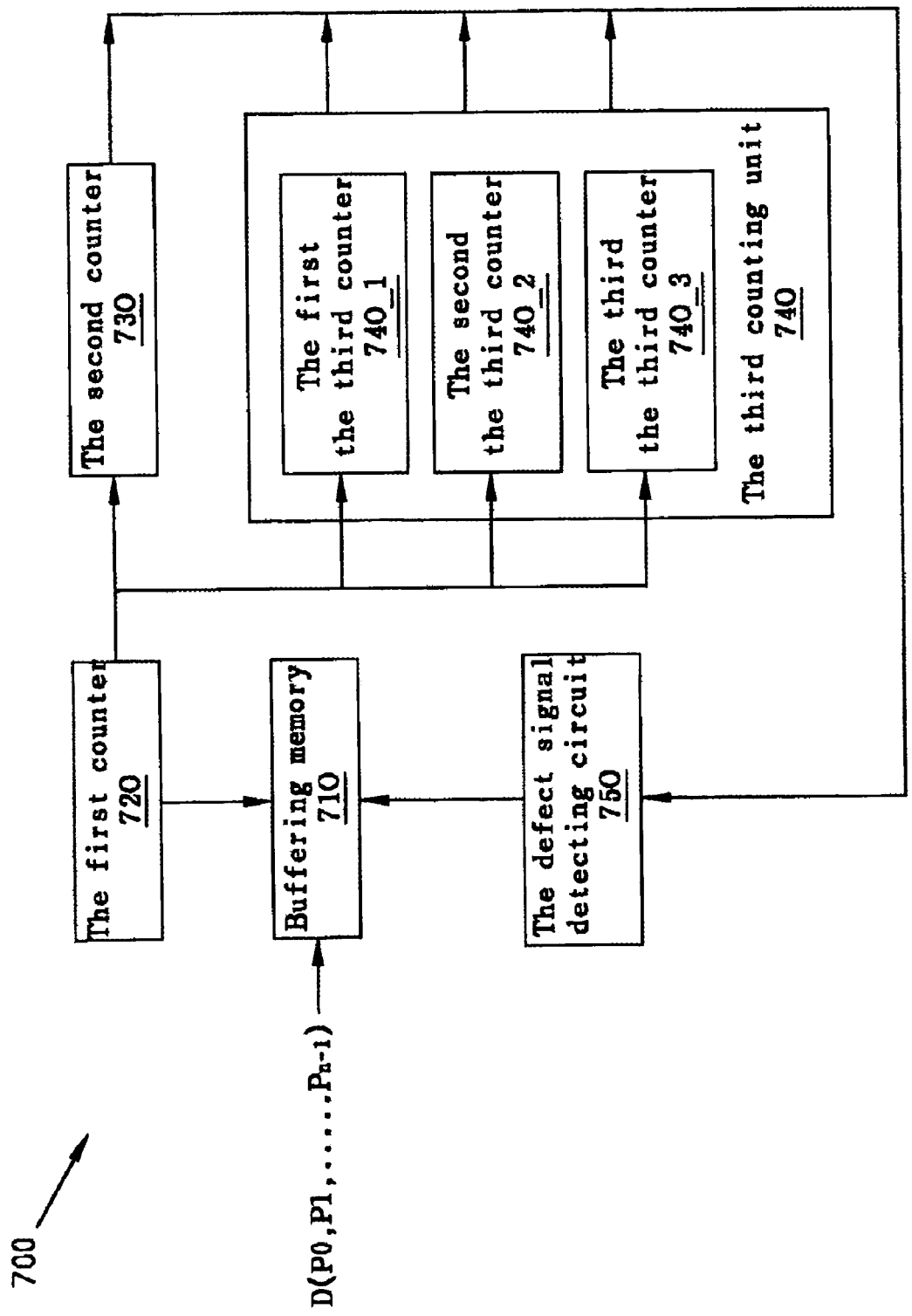
FIG. 7 is the apparatus of the present invention applied in the reading of an optical disk.

An example of an optical disk is described as following. The length of every frame signal of an optical disk is known to be 588T. The range of every pit length is from 3T to 11T. An optical disk servo system is illustrated. As mentioned above, the present invention is applied in an apparatus 700 of an optical disk servo system for detecting defect signals, as shown in FIG. 7, including a first counter 720, a second counter 730, a third counting unit 740, and a defect signal detecting circuit 750. The buffering memory 710 stores data signals D of the optical disk, wherein every data signal D includes a plurality of pits $(P_0, P_1, P_2 \ldots P_{N-1})$ with different lengths. The first counter 720 couples to the buffering memory 710 for counting the length $(L_0, L_1, L_2 \ldots L_{N-1})$ of each pit $(P_0, P_1, P_2 \ldots P_{N-1})$. The second counter 730 couples to the first counter 720 for accumulating the numbers, counted by the first counter 720, of the pits whose pit lengths $(L_0, L_1, L_2 \ldots L_{N-1})$ are within a default pit length range RANGE (3T-11T) of the pit length each time, and comparing the accumulated number CNT2 with the corresponding default threshold SHR2. The third counting unit 740 includes three the third counters (740_1, 740_2, 740_3) and respectively couples to the first counter 720. Each of the third counters (740_1, 740_2, 740_3) includes a corresponding pit length range outside the default pit length range RANGE (3T-11T) but within the corresponding pit length (CNT3_1, CNT3_2 . . . ) respectively. In another word, The first the third counter 740_1 accumulates the number CNT3_1 of the pits whose pit lengths $(L_0, L_1, L_2 \ldots L_{N-1})$ are smaller than the default pit length range RANGE (smaller than 3T). The second the third counter 740_2 accumulates the number CNT3_2 of the pits whose pit lengths $(L_0, L_1, L_2 \ldots L_{N-1})$ are bigger than the default pit length range RANGE (bigger than 11T). The third the third counter 740_2 accumulates the number CNT3_3 of the pits whose pit lengths $(L_0, L_1, L_2 \ldots L_{N-1})$ are much bigger than the default pit length range RANGE (much bigger than 11T, such as 18T). Besides, each of the third counters (740_1, 740_2, 740_3) includes a corresponding default threshold (SHR3_1, SHR3_2, SHR3_3) respectively to be compared with the corresponding accumulated number (CNT3_1, CNT3_2, CNT3_3) respectively. The defect signal detecting circuit 750 generates a defect flag signal DEF_FLAG set at the low logic level. The defect flag signal DEF_FLAG changes the logic level of itself in accordance with the result of the comparison by comparing the accumulated numbers CNT2, and (CNT3_1, CNT3_2 . . . ) of the second counter 730 and the third counting unit 740 with the corresponding default threshold SHR2, and (SHR3_1, SRR3_2, SHR_3).

Figure 8A:
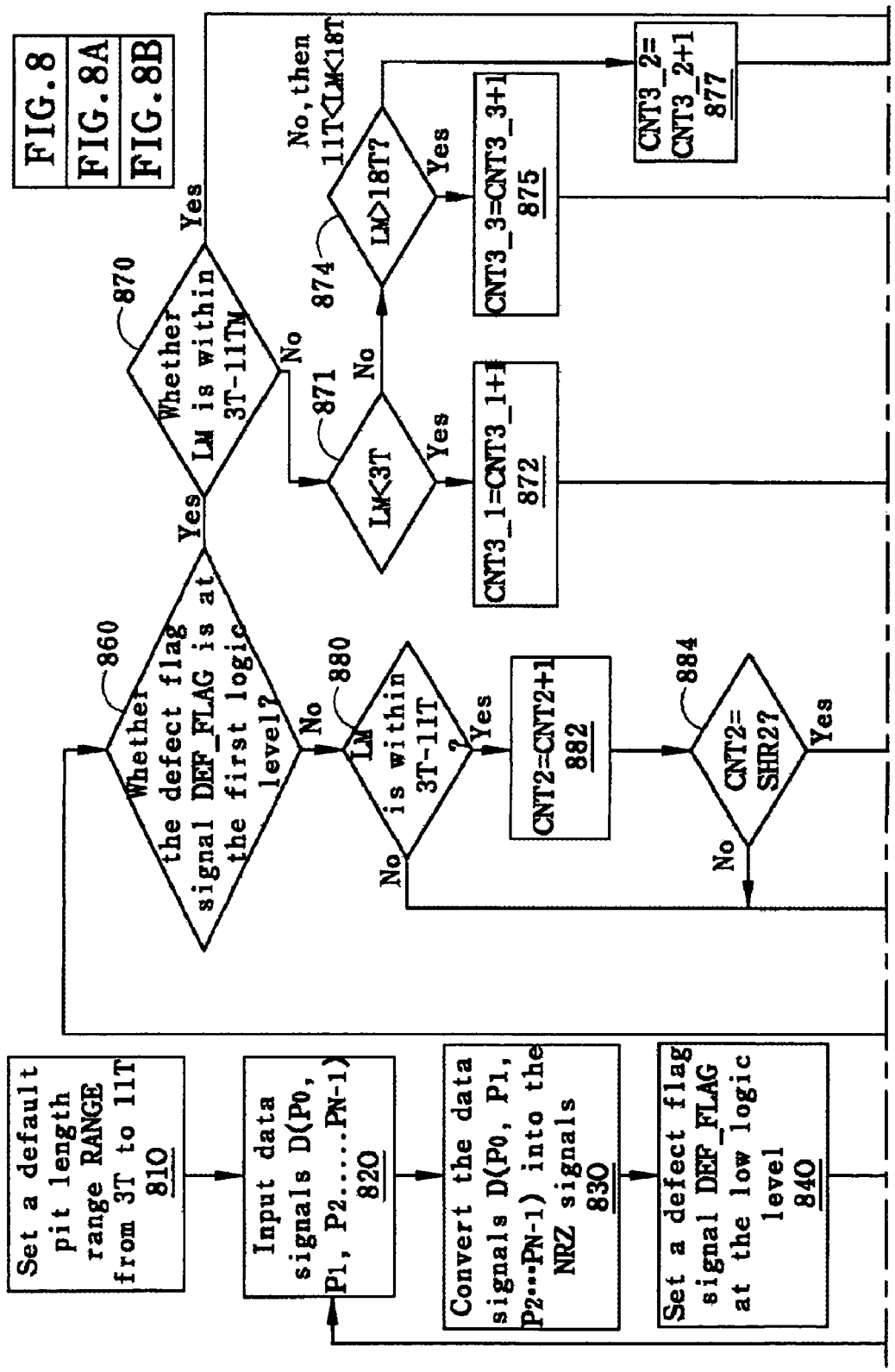
FIG. 8 is the flow chart of the present invention applied in the reading of an optical disk.
Figure 8B:
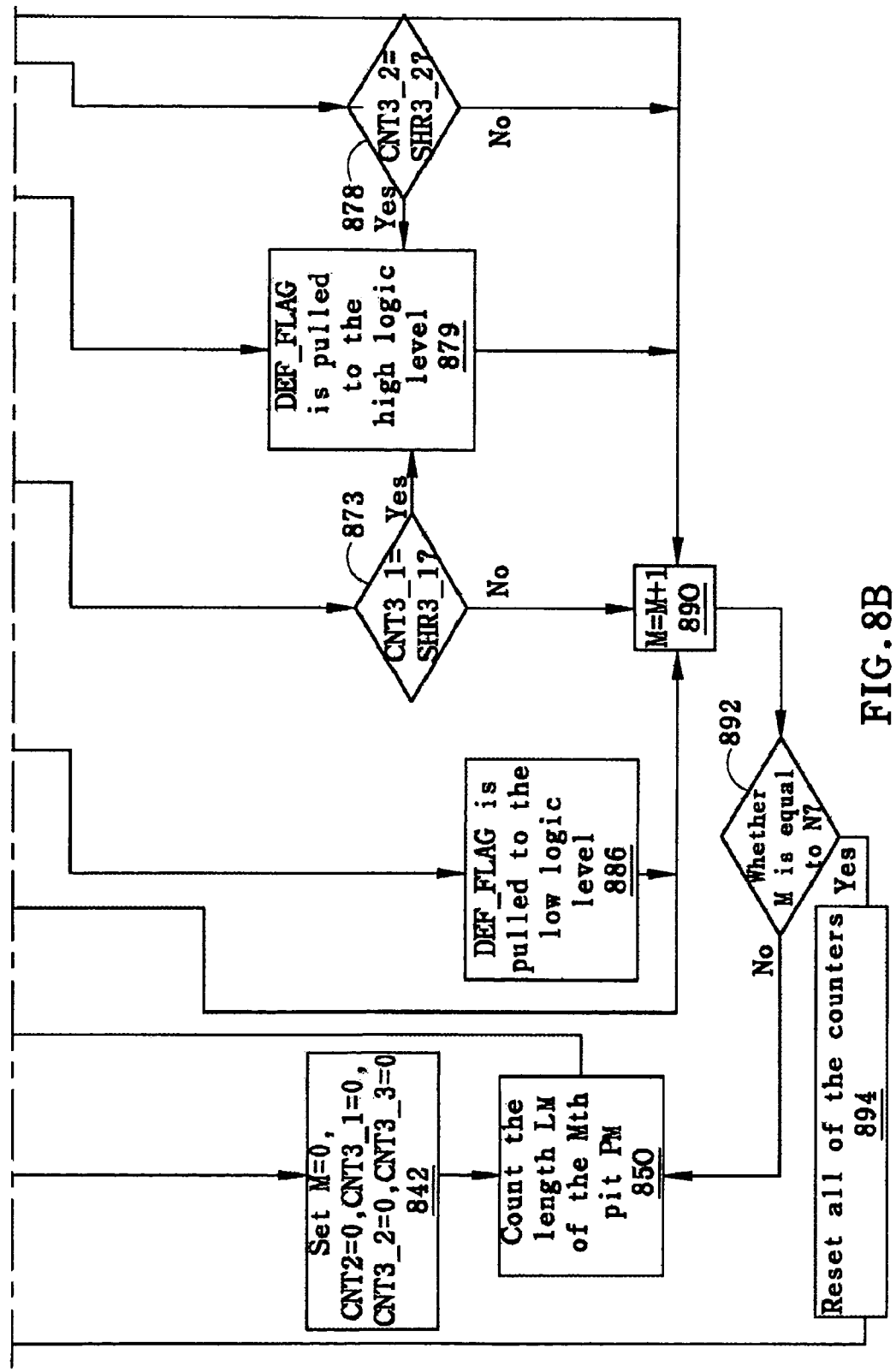

The method of the present invention applied on an optical disk servo system for detecting defect signals of an optical disk is shown as FIG. 8:

Set the default pit length range RANGE of the pit length as 3T-11T (810);

Input data signals $D(P_0, P_1, P_2 \ldots P_{N-1})$ including a plurality of pits (820);

Convert the data signals $D(P_0, P_1, P_2 \ldots P_{N-1})$ into the NRZ signals (830);

Set a defect flag signal DEF_FLAG at the low logic level (840);

Set M=0, CNT2=0, CNT3_1=0, CNT3_2=0, CNT3_3=0 (842);

Count the length $L_M$ of the Mth pit $P_M$ (850);

Judge whether the defect flag signal DEF_FLAG is at the low logic level; if yes, execute step 870, otherwise, execute step 880 (860);

Judge whether the pit length $L_M$ is within the default pit length range RANGE (=3T-11T) of the pit length; if yes, execute step 890, otherwise, execute step 871 (870);

Judge whether the pit length $L_M$ is smaller than 3T; if yes, execute step 872, otherwise execute step 874 (871);

The accumulated number CNT3_1 of the first the third counter 740_1 adds 1; in another word, CNT3_1=CNT3_1+1, and then execute step 873 (872);

Judge whether CNT3_1 reaches the default threshold SHR3_1; if yes, execute step 876, otherwise, execute step 890 (873);

Judge whether the pit length $L_M$ is bigger than 18T; if yes, execute step 875, otherwise, execute step 877 (874);

The accumulated number CNT3_3 of the third the third counter 740_1 adds 1; in another word, CNT3_3=CNT3_3+1, and then execute step 876 (875);

Judge whether CNT3_3 reaches the default threshold SHR3; if yes, execute step 879, otherwise, execute step 890 (876);

The accumulate number CNT3_2 of the second the third counter 740_3 adds 1, CNT3_2=CNT3_2+1, and then execute step 878 (877);

Judge whether CNT3_2 reaches the default threshold SHR2; if yes, execute step 879, otherwise, execute step 890 (878);

The defect flag signal DEF_FLAG is pulled to the high logic level, and then jump to step 890 (879);

Judge whether the pit length $L_M$ is within the default pit length range RANGE (=3T-11T) of the pit length; if yes, execute step 882, otherwise execute step 890 (880);

The accumulated number CNT2 of the second counter 730 is CNT2=CNT2+1 (882);

Judge whether the accumulate number CNT2 reaches the default threshold SHR2; if yes, execute step 886, otherwise, execute step 890 (884);

The defect flag signal DEF_FLAG is pulled to the low logic level, and jump to step 890 (886);

M=M+1 (890);

Judge whether M is equal to N; if yes, execute step 894, otherwise, execute step 850 (892); and Reset all of the counters, and return to step 820 (894).

Figure 9:
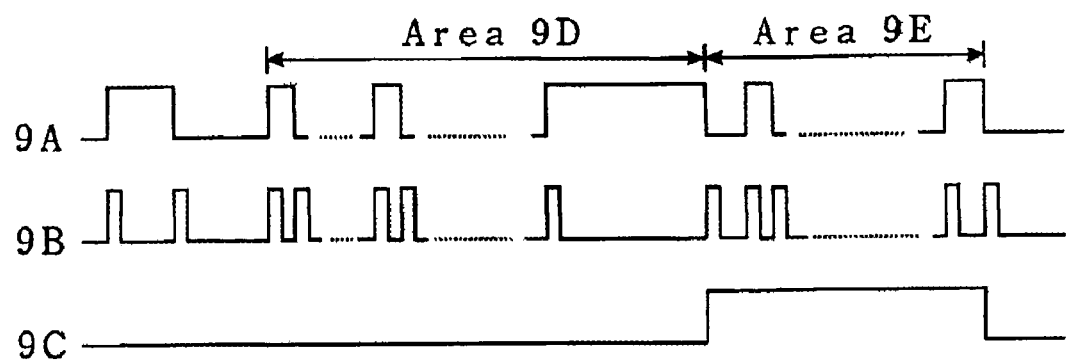
FIG. 9 is the signal diagram of the present invention applied in the reading of an optical disk.

According to the mentioned above, as shown in FIG. 9, 9A is a data signal with defect signals, 9B is the corresponding NRZ signal, and 9C is the defect flag signal. When the defect flag signal 9C is at low logic level, only the number that the pits whose pit lengths are against 3T-11T coding are counted. Therefore, if the number that the pits whose pit lengths are smaller than 3T or bigger than 11T in the area 9E reach the default threshold SHR3_1 or SHR3_2, or when the pit length is bigger than 18T even once, the defect flag signal DEF_FLAG is pulled to the high logic level to inform the optical disk servo system to stop locking the data signals (defect signals). Otherwise, when the defect flag signal DEF_FLAG is at the low logic level, only the number that the pits whose pit lengths fit the 3T-11T NRZ coding are counted. In another world, when the accumulate numbers that the pits whose pit lengths fit the 3T-11T NRZ coding reaches the default threshold SHR2 in 9F, the defect flag signal DEF_FLAG is pulled from the high logic level to the low logic level to inform the optical disk servo system to start locking the data signals.

Although there is a plastic layer covering an optical disk to protect the data in the optical disk, it is unavoidable that the data in the optical disk is possible to have defect data caused by unconscious scratches or some other external facts. If the optical disk servo system does not detect the defect signals correctly, it is possible to cause mistakes when reading, or further cause fault movements of the optical disk servo system.

As the mentioned above, the present invention provides the apparatus and method for detecting defect signals so that the optical disk servo system can judge whether there is any defect signal without the need to adopting the DC reference voltage externally. By adopting the apparatus and method for detecting defect signals of the present invention, the optical disk servo system can identify where the defect signals are fast and efficiently to work as the authority on whether the optical disk servo system controls the lock-tracking.

Although the present invention is applied on the preferred embodiments for reading data signals in an optical disk of an optical disk servo system, it does not mean to limit the spirit of the present invention and also does not mean that the essence of the present invention can only be applied on the embodiments mentioned above. It can cover any kind of data modes of optical disks, such as digital versatile optical disk data mode. The spirit of the present invention covers them all. Therefore, any modification without departing the spirit and scope of the present invention should all be included in the following claims.

What is claimed is:

1. A method for detecting defect signals, comprising:
   setting a default pit length range;
   inputting a data signal including a plurality of pits;
   transforming the data signal into a non-return to zero (NRZ) signal;
   determining a pit length of each of a plurality of the pits;
   counting a first number of a plurality of the pits whose pit lengths are within the default pit length range and counting a second number of a plurality of the pits whose pit lengths are outside the default pit length range; and
   triggering a defect flag signal when the first number or the second number reach a plurality of corresponding thresholds respectively, wherein a default level of the defect flag signal is set at a first logic level.

2. The method for detecting defect signals according to claim 1, wherein the defect flag signal is triggered to be at the first logic level when the first number reaches a first corresponding threshold.

3. The method for detecting defect signals according to claim 1, wherein the defect flag signal is triggered to be at a second logic level when a third number of a plurality of the pits whose pit lengths are bigger than a maximum value of the default pit length range reaches a second corresponding threshold.

4. The method for detecting defect signals according to claim 1, wherein the defect flag signal is triggered to be at the second logic level when a fourth number of a plurality of pits whose pit lengths are smaller than a minimum value of the default pit length range reaches a third corresponding threshold.

5. The method for detecting defect signals according to claim 1, further comprising setting a maximum threshold, and triggering the defect flag signal to be at the second logic level when a length of one of a plurality of the pits is bigger than the maximum threshold, wherein the maximum threshold is outside the default pit length range.

6. The method for detecting defect signals according to claim 1, wherein all of the numbers are reset when the defect flag signal is triggered.

7. The method for detecting defect signals according to claim 1, wherein the method is adopted in any of the group consisting of CD-ROM, CD-RW, DVD-ROM, DVD-RW, DVD+RW, and DVD-RAM.

8. The method for detecting defect signals according to claim 1, wherein the data signal is processed in 8 to 14 modulation.

9. The method for detecting defect signals according to claim 1, wherein the data signal is processed in 8 to 16 modulation.

10. The method for detecting defect signals according to claim 1, wherein the default pit length range is from 3T to 11T.

11. The method for detecting defect signals according to claim 1, wherein the data signal is 588T.

12. The method for detecting defect signals according to claim 1, wherein the data signal is 1488T.

13. An apparatus for detecting defect signals, comprising:
   a buffering memory to receive a data signal, wherein the data signal includes a plurality of pits;
   a first counter, connected to the buffering memory, to store a pit length of one of a plurality of the pits in accordance with an order of a plurality of the pits;
   a second counter, connected to the first counter, to count a first number of a plurality of the pits whose pit lengths are within a default pit length range, and compare the first number with a first corresponding default threshold;
   a plurality of third counters, connected to the first counter, to count a second number of a plurality of the pits whose pit lengths are outside the default pit length range, wherein each of a plurality of the third counters includes a corresponding pit length range to count a third number of a plurality of the pits whose pit lengths are within the corresponding pit length range respectively and compare the third number with a second corresponding threshold respectively; and a defect flag signal generating circuit, connected to the buffering memory, the second counter, and a plurality of the third counters, to generate a defect flag signal at a default logic level, and trigger a logic level of the defect flag signal to be at a first logic level or a second logic level in accordance with a result of comparison of the first and the second numbers and the first corresponding default threshold and the second corresponding threshold, wherein the default logic level is the first logic level.

14. The apparatus for detecting defect signals according to claim 13, wherein the defect flag signal is triggered to be at the first logic level when first number reaches the first corresponding default threshold.

15. The apparatus for detecting defect signals according to claim 13, wherein a plurality of the third counters comprising:

a fourth counter to count a plurality of fourth numbers of a plurality of the pits whose pit lengths are bigger than a maximum value of the default pit length range and smaller than a maximum threshold, wherein the maximum threshold is outside the default pit length range;

a fifth counter to count a plurality of fifth numbers of a plurality of the pits whose pit lengths are smaller than the minimum value of the default pit length range; and a sixth counter to count a plurality of sixth numbers of a plurality of the pits whose pit lengths are bigger than the maximum threshold.

16. The apparatus for detecting defect signals according to claim 15, wherein the defect flag signal is triggered to be at the second logic level when a fourth number reaches a corresponding default threshold of the fourth counter.

17. The apparatus for detecting defect signals according to claim 15, wherein the defect flag signal is triggered to be at the second logic level when a fifth number reaches a corresponding default threshold of the fifth counter.

18. The apparatus for detecting defect signals according to claim 15, wherein the defect flag signal is triggered to be at the second logic level when a sixth number reaches a corresponding default threshold of the sixth counter.

19. The apparatus for detecting defect signals according to claim 13, wherein the apparatus is adopted in any of the group consisting of CD-ROM, CD-RW, DVD-ROM, DVD-RW, DVD+RW, and DVD-RAM.

20. The apparatus for detecting defect signals according to claim 13, wherein the default pit length range is from 3T to 11T.

21. An apparatus for detecting defect signals comprising:
buffering memory means for receiving a data signal, wherein the data signal includes a plurality of pits;
first counter means to store a pit length of a pit of the plurality of the pits;
second counter means for counting a first number of pits whose pit lengths are within a default pit length range, and for comparing the first number with a first default threshold;
at least one third counters means for counting a second number of pits whose pit lengths are outside the default pit length range, wherein each of a plurality of the third counters includes a corresponding pit length range to count a third number of a plurality of the pits whose pit lengths are within the corresponding pit length range respectively and compare the third number with a second threshold respectively; and
defect flag signal generating circuit means to generate a defect flag signal at a default logic level, and trigger a logic level of the defect flag signal to be at a first logic level or a second logic level in accordance with a result of comparison of the first and the second numbers and the first default and the second thresholds, wherein the default logic level is the first logic level.

22. An apparatus for detecting defect signals comprising:
means for transforming a data signal including a plurality of pits into a non-return to zero (NRZ) signal;
means for determining a pit length of each of a plurality of the pits;
counter means for counting a first number of a plurality of the pits whose pit lengths are within a default pit length range and counting a second number of a plurality of the pits whose pit lengths are outside the default pit length range; and
triggering means for triggering a defect flag signal when the first number or the second number reach a plurality of corresponding thresholds respectively, wherein a default level of the defect flag signal is set at a first logic level.

23. The apparatus of claim 22, wherein the triggering means is operative to trigger the defect flag signal to be at the first logic level when the first number reaches a first corresponding threshold.

24. The apparatus of claim 22, wherein the triggering means is operative to trigger the defect flag signal to be at a second logic level when a third number of pits whose pit lengths are bigger than a maximum value of the default pit length range reaches a second corresponding threshold.

25. The apparatus of claim 22, wherein the counter means is operative to reset all of the numbers when the defect flag signal is triggered.

* * * * *

UNITED STATES PATENT AND TRADEMARK OFFICE
CERTIFICATE OF CORRECTION

| | | |
|---|---|---|
| PATENT NO. | : 7,649,820 B2 | Page 1 of 1 |
| APPLICATION NO. | : 11/050815 | |
| DATED | : January 19, 2010 | |
| INVENTOR(S) | : Shih-Lung Ouyang et al. | |

It is certified that error appears in the above-identified patent and that said Letters Patent is hereby corrected as shown below:

In column 1, line 7, delete "Number93103410," and insert -- Number 93103410, --, therefor.

In column 1, line 18, delete "Discription" and insert -- Description --, therefor.

In column 1-2, line 65-67 and 1-5, delete "For an optical disk, there is a plastic layer on its surface for protection, but it is likely to have defect signals produced by scratches or some exterior factors, such as the process of recording, fingerprints . . . etc. The defect signals cause the pickup head not to reflect the correct RF signals when tracking. Therefore, the optical disk system cannot read out the needed data signals and then cause false movements." and insert the same on Col. 1, Line 66 as a new paragraph.

In column 4, line 54, delete "SH2." and insert -- SHR2. --, therefor.

In column 6, line 25, delete "SRR3_2," and insert -- SHR3_2, --, therefor.

Signed and Sealed this

Sixteenth Day of March, 2010

David J. Kappos
*Director of the United States Patent and Trademark Office*